United States Patent [19]

Ehsani

[11] Patent Number: 5,287,261
[45] Date of Patent: Feb. 15, 1994

[54] POWER CONVERSION USING ZERO CURRENT SOFT SWITCHING

[75] Inventor: Mehrdad Ehsani, Bryan, Tex.

[73] Assignee: The Texas A&M University System, College Station, Tex.

[21] Appl. No.: 902,872

[22] Filed: Jun. 23, 1992

[51] Int. Cl.⁵ .......................... H02M 3/135
[52] U.S. Cl. ........................ 363/124; 323/222; 323/225
[58] Field of Search ............ 363/13, 15, 16, 27, 363/95, 96, 97, 123, 124, 131, 135; 323/222, 223, 225

[56] References Cited

U.S. PATENT DOCUMENTS

| | | | |
|---|---|---|---|
| 4,184,197 | 1/1980 | Cuk et al. | 363/16 |
| 4,186,437 | 1/1980 | Cuk | 363/16 |
| 5,208,740 | 5/1993 | Ehsani | 363/124 |

OTHER PUBLICATIONS

M. O. Bilgic and M. Ehsani, "Time Averaged Behaviors of Single and Dual Flying Capacitor Converters" *International Journal of Electronics*, vol. 66, pp. 655-663, Dec. 1989.

E. D. Simon and Bronner, "An Inductive Energy Storage System Using Ignitron Switching", *IEEE Transactions on Nuclear Science*, vol. NS-14, No. 5, Jan. 1967.

M. Ehsani, A. Hozhabri and R. L. Kustom, "Decoupled Control Techniques for Dual Flying Capacitor Bridge Power Supplies for Large Superconductive Magnets", *IEEE Trans. on Magnetics*, vol. MAG-23, No. 2, Nov. 1987.

S. Cuk and R. D. Middlebrook, "A New Optimum Topology Switching DC-to-DC Converter", *IEEE Power Electronics Specialists Conference Records*, pp. 160-179, Jun. 1977.

M. O. Bilgic and M. Ehsani, "Analysis of Single Flying Capacitor Converter by the State-Space Averaging Technique," *IEEE International Symposium on Circuits and Systems Proceedings*, pp. 1151-1154, Dec. 1989.

Article by E. P. Dick and C.-H. Dustmann, "Industive Energy Transfer Using A Flying Capacitor", published in Energy Storage, Compression, and Switching, Dec. 1976 Plenum Press, New York, pp. 485-489.

Hamada et al., "A New Conceptional PWM DC/DC Converter with Zero-Voltage Switching Incorporating Non-Controlled Saturable Reactors" Sep. 1989 IEEE; pp. 881-888.

Ferreira et al., "A Generic Soft Switching Converter Topology with a Parallel Nonlinear Network for High Power Applications", Aug. 1990 IEEE; pp. 298-304.

DeDoncker et al.; "A Three-Phase Soft-Switched High-Power Density DC/DC Converter for High Power Applications"; Feb. 1991 IEEE pp. 63-73.

*Primary Examiner*—Jeffrey Sterrett
*Attorney, Agent, or Firm*—Baker & Botts

[57] ABSTRACT

A zero current soft switching power converter (10) is provided in which a link capacitor (20) is coupled between a source switch $S_1$ and a source switch $S_2$. The reversal of voltage polarity across link capacitor (20) allows for zero current switching of switches $S_1$ and $S_2$.

23 Claims, 3 Drawing Sheets

POWER CONVERSION USING ZERO CURRENT SOFT SWITCHING

TECHNICAL FIELD OF THE INVENTION

This invention relates generally to electronic circuits, and more particularly to a method and apparatus for high power conversion using soft switching.

BACKGROUND OF THE INVENTION

Modern power supplies use the basic technology of switching power converters to improve efficiency and compactness. The advent of the silicon controlled rectifier has allowed these switching power converters to be solid state devices. Variable AC or DC output voltages or currents in these switching power supplies are generated by many well known methods, most commonly by the method known as pulse width modulation ("PWM"). Typical applications include AC power supplies for AC motor drives or DC power supplies for a myriad of electronic circuits or industrial processes.

Using the pulse width modulation method, solid state switches within converters are switched at relatively high frequencies. The variation of the switching intervals (pulse width) is controlled to produce the desired slow variations of the average DC or AC output waveforms. However, a non-negligible amount of energy loss is associated with each switching action of the solid state switches. Because switching at high frequencies is required to achieve the desirable output waveform fidelities, the overall switching losses of conventional converters are rather high, since energy is lost during each switching action. Consequently, conventional converters are limited to lower power applications, where the resulting low efficiencies and heat dissipation problems caused by the losses in the switches are tolerable.

An example of a conventional power converter, known as the Cuk converter, has been disclosed by S. Cuk and R. D. Middlebrook, *Coupled Inductor and Other Extensions of a New Optimum Topology Switching DC-to-DC Converter,* IEEE Industry Application Society Annual Meeting, pp. 1110–1126, 1977. Significant limitations exist within the Cuk converter and other conventional converters because the switching elements are "hard switched". Hard switching occurs when the switches within the converter are switched while there is a voltage across the switches and a current flowing through the switches. Because of this hard switching, significant losses, as described above, result within the switches. Consequently, the useful power of the Cuk and other conventional converters is limited to less than 10 kilowatts, and their frequency range is also limited because of switching losses to ranges on the order of 10 kilohertz. Furthermore, because of the design and method of operation of the Cuk converter, only gate turn off devices, and not devices such as silicon controlled rectifiers, can be used as the switching elements.

Recent attention has focused on converters that use zero-current or zero-voltage switching for increasing power converter efficiency. Resonant and quasi-resonant converters have been developed to make use of these zero-current and zero-voltage switching techniques. However, difficulties involved in matching the operating frequency with the resonance components, magnetic saturation, and increased component stress present significant limitations for such converters.

Zero voltage "soft-switching" converters have also been proposed to overcome some of the limitations of resonant and quasi-resonant converters. See, S. Hamada et al., *A New Conceptional PWM DC-DC Converter with Zero-Voltage Switching Incorporating Non-Controlled Saturable Reactors,* IEEE-PESC Conf. Rec. 1989; J. A. Ferreira, et al., *A General Soft Switching Converter Topology with a Parallel Nonlinear Network for High Power Applications,* IEEE-PESC Conf. Rec. 1990; R. W. De-Doncker, et al., *A Three-Phase Soft-Switched High-Power Density DC—DC Converter for High Power Applications,* IEEE Trans. on IAS, Volume 27, No. 1, January–February 1991. However, these converters present significant limitations. In particular, they require increased current ratings, as high as 200 percent, especially in high power applications. The increased current results in significant increases in conduction losses, as well as higher power device costs.

Therefore, a need has arisen for a zero-loss switching converter that produces less device and component stresses than existing converter topologies. Furthermore, a need has arisen for a non-resonant converter that uses zero-current soft switching. A need has also arisen for a converter that can use both gate turn-off switches for efficient high frequency switching and SCRs for high power applications.

SUMMARY OF THE INVENTION

In accordance with the present invention, a zero current soft switching power converter and method are provided which substantially eliminate or reduce disadvantages or problems associated with prior art converters. In particular, a power converter and method are provided in which a link capacitor is coupled between a source switch and a load switch. The switches are switched in a switching cycle such that the voltage across the link capacitor reverses polarity each switching cycle. Because the link capacitor voltage reverses polarity each switching cycle, zero current soft switching of both the source and load switches is realized.

In a particular embodiment of the present invention, a source snubber inductor is included in series with the source switch, and a load snubber inductor is included in series with the load switch. These snubber inductors operate to recirculate snubber inductor energy when current through the offgoing switch decreases due to current conduction through the other switch.

An important technical advantage of the present invention is that the voltage across the link capacitor reverses polarity, thereby allowing for zero current soft switching of the source and load switches. Due to this zero current switching, substantial reduction in switching losses are achieved, thereby allowing for high power and high frequency applications of the converter of the present invention.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
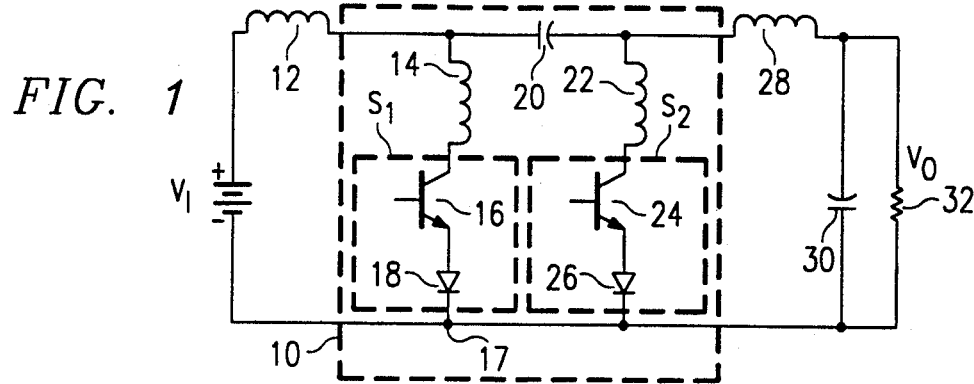
FIG. 1 illustrates a circuit schematic of a capacitively coupled converter constructed according to the teachings of the present invention.

FIG. 1 is a circuit schematic of a capacitively coupled converter ("C$^3$") circuit 10 constructed according to the teachings of the present invention. As shown in FIG. 1, an input voltage $V_i$ is coupled to circuit 10 through a source inductor 12. Source inductor 12 is coupled to a snubber inductor 14 of circuit 10. Snubber inductor 14 is coupled to the collector of a transistor 16. Transistor 16 is coupled through its emitter to a node 17 through a diode 18. Inductors 12 and 14 are also coupled to one electrode of a link capacitor 20. Components 12 through 18 may be considered to be on the source side of circuit 10.

Link capacitor 20 links the source side of circuit 10 to its load side. To the load side electrode of capacitor 20 is coupled a snubber inductor 22. Snubber inductor 22 is coupled to the collector of a transistor 24. The emitter of transistor 24 is coupled to node 17 through a diode 26. Also coupled to snubber inductor 22 and link capacitor 20 is a load inductor 28. An output filter capacitor 30 is coupled between load inductor 28 and node 17. A load driven by the load side of circuit 10 is indicated by resistor 32.

As shown in FIG. 1, the input voltage is coupled to circuit 10 through source inductor 12. Thus, the input to circuit 10 is considered a current source. Likewise, the load has been connected to circuit 10 through load inductor 28. Thus, the load is considered a current sink.

As shown in FIG. 1, transistor 16 and diode 18 comprise a switch, $S_1$. Similarly, transistor 24 and diode 26 comprise a switch, $S_2$. As shown in FIG. 1, transistors 16 and 24 may comprise bipolar junction transistors and are switched by controlling their base terminals. Switches $S_1$ and $S_2$ may comprise other gate turnoff devices such as MOS-controlled thyristors ("MCTs"), GTOs, and IGBTs. As will be discussed, switches $S_1$ and $S_2$ may also comprise silicon controlled rectifiers ("SCRs") for high power applications.

In operation, link capacitor 20 is charged through switch $S_1$, and alternatively discharged through switch $S_2$ in each switching cycle. Because the current alternates through the link capacitor 20, the output voltage will be equal to the average capacitor voltage.

The operation of circuit 10 is as follows: assuming initially that switch $S_2$ is conducting, link capacitor 20 is charged from the input current source ($V_i$ in combination with source inductor 12), and therefore the voltage on capacitor 20 is rising. Switch $S_1$ is turned on at zero current due to the snubber inductor 14. A resonant subcircuit is formed while both switches are still conducting. If the characteristic impedance of the formed resonant loop is small enough, the voltage on capacitor 20 will remain approximately constant, but the inductor current through the switch $S_2$ will decrease rapidly. During this commutation process, not only has the current decayed in the switch $S_2$, but also the snubbed energy during conduction is recirculated. As the capacitor 20 begins to discharge, switch $S_2$ is gated off at zero current. Because of the blocking diode 26, the current through switch $S_2$ cannot reverse its direction and therefore switch $S_2$ can be turned off at the zero current condition. During the interval in which switch $S_1$ is conducting, the link capacitor 20 will discharge into the output current sink (load inductor 20 and the load 32). The same resonant subcircuit as described above, but with different initial conditions (i.e., switch $S_1$ on and switch $S_2$ off) will bring the switching cycle to completion.

The snubber inductors 14 and 22 are included in circuit 10 to alleviate turn-on related losses by recirculating snubber inductor energy at switch cutoff. Consequently, snubber inductors 14 and 22 may be omitted in applications where switching losses need not be minimized.

Figure 2:
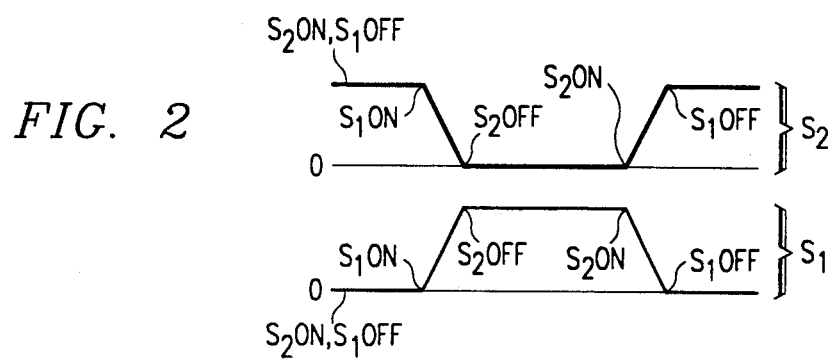
FIG. 2 is a graph of current flowing through the switches of a capacitively coupled converter constructed according to the teachings of the present invention.

FIG. 2 illustrates current flow through switches $S_1$ and $S_2$ for the operation of circuit 10 as described above. As shown in the graph for switch $S_1$, no current is initially flowing through switch $S_1$. Switch $S_1$ is turned on at this zero current condition, and current rises through switch $S_1$ until switch $S_2$ is turned off. When switch $S_2$ is turned off, the current through switch $S_1$ is constant while link capacitor 20 discharges to the load. When switch $S_2$ turns on, the current rapidly decreases in switch $S_1$ until it reaches zero, and remains there because of blocking diode 18. At this point, switch $S_1$ is turned off. Similarly, the graph for switch $S_2$ shows the current through switch $S_2$. Initially, switch $S_2$ is on and the current in switch $S_2$ rapidly decreases when switch $S_1$ turns on. When the current through switch $S_2$ reaches zero, and remains there because of blocking diode 26, switch $S_2$ is turned off. Zero current flows through switch $S_2$ as link capacitor 20 discharges to the load. Switch $S_2$ is turned on and current increases through switch $S_2$ until switch $S_1$ turns off.

Although FIG. 2 shows a constant frequency operation, as long as the commutation time is much shorter than the switching cycle, both the duty cycle and the frequency can be varied to control power flow.

Figure 3:
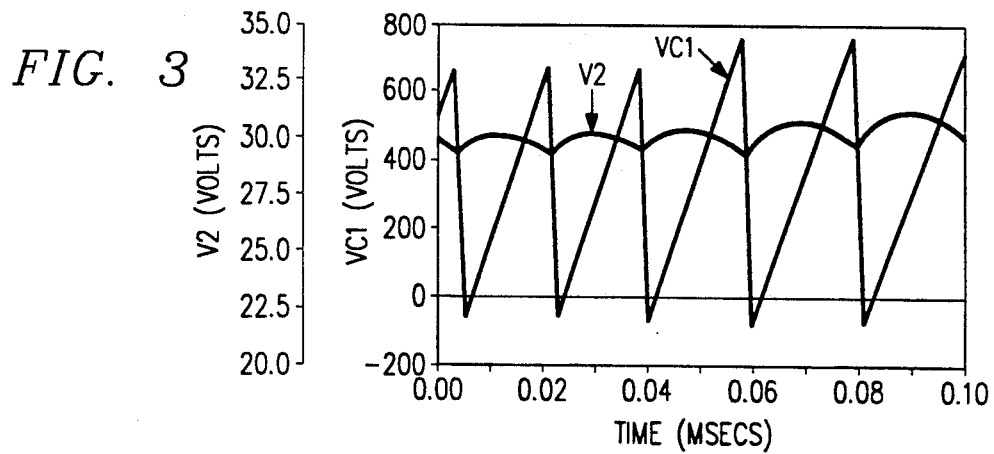
FIG. 3 is a graph of capacitor and output voltage due to gain change of a capacitively coupled converter constructed according to the teachings of the present invention.

FIG. 3 is a graph representing the voltage across link capacitor 20, $V_{cl}$, and the output voltage, $V_2$, indicated across resistor 32 of FIG. 1. As shown in FIG. 3, an AC voltage results across link capacitor 20. As described above, the voltage across link capacitor 20 charges while switch $S_2$ is on, and discharges while switch $S_1$ is on. FIG. 3 represents these voltages for two different gains, resulting from changes in the switching speed. As shown in FIG. 3, the first three voltage peaks across link capacitor 20 are equal, and the last three voltage peaks are at a voltage higher than the first three. Similarly, the output voltage rises for the last three cycles shown in FIG. 3. The first three cycles represent the first gain, and the last three cycles represent the second gain. As the length of time that switch $S_1$ is left off increases, the charge on link capacitor will likewise rise, resulting in the increased gain shown in the last three cycles. It should be understood that the waveform of FIG. 3 represents power flow from the source side to the load side. If the average voltage across capacitor 20 were negative, using the same polarity references as in FIGS. 1 and 3, then power would flow from the load side to the source side.

Figure 4:
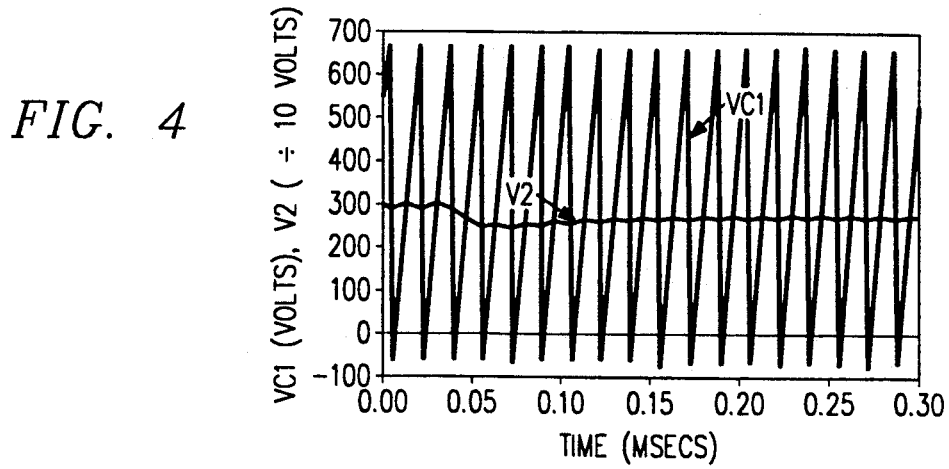
FIG. 4 is a graph of capacitor and output voltage due to load change of a capacitively coupled converter constructed according to the teachings of the present invention.

FIG. 4 represents the voltage across link capacitor 20 and the output voltage due to a load change. As is shown in FIG. 4, an increase in the load results in a transient condition in which the output voltage drops and then rises asymptotically back to its initial condition.

To obtain a stable operation in steady state for circuit 10, the following three conditions should be satisfied:

1. The average of the voltage across switch $S_1$, $<v_{s1}>$, must be equal to the input voltage, $V_1$.

$$<v_{s1}> = V_1 \qquad (1)$$

2. The average of the voltage across the switch $S_2$, $<v_{s2}>$, must be equal to the output voltage, $V_2$.

$$<v_{s2}> = V_2 \qquad (2)$$

3. The rate of energy transferred by the link capacitor 20, $C_1$, must be equal to the rate of the energy consumed by the load 32, R.

$$\frac{1}{2} C_1 V_o^2 - \frac{1}{2} C_1 V_m^2 = \frac{V_2^2}{R} T \qquad (3)$$

where $V_o$ is the positive peak value of the link capacitor 20 ($C_1$) voltage and $V_m$ is the negative peak, as shown in FIG. 3, and T is the switching period.

These three conditions can also be formulated as follows:

$$V_1 = \frac{V_o - V_m}{2} \left( \frac{1}{1 + G} \right) \qquad (4)$$

$$V_2 = \frac{V_o - V_m}{2} \left( \frac{G}{1 + G} \right) \qquad (5)$$

$$\frac{2RC_1}{T} = \frac{G^2}{(1 + G)} \frac{V_o - V_m}{V_o + V_m}, \qquad (6)$$

where G is the voltage gain ($V_2/V_1$).

To guarantee commutation in the loop consisting of switch $S_1$, link capacitor 20, and switch $S_2$, $V_m$ must be set by design. Similarly, to guarantee voltage protection of the switches, $V_o$ is also set by design.

In the following, a design example will be presented for illustration. The $C^3$ to be designed has the following specifications:

Input voltage, $V_1 = 270$V
Output voltage, $V_2 = 28$V
Output Power, $P = 25$KW
Switching Frequency, $f_s = 50$KHz
Gain $= 0.104$.
The load resistance will be $$R = V_2^2/P = 28^2/25 \times 10^3 = 0.0314 \text{ ohms}.$$

Assuming $V_m/V_o = 0.1$, from equation (6) the link capacitor 20, $C_1$ is $$\begin{aligned} C_1 &= \frac{T}{2R} \frac{G^2}{(1+G)^2} \frac{V_o - V_m}{V_o + V_m} \qquad (7) \\ &= \frac{20 \times 10^{-6}}{2 \times 0.0314} \frac{0.104^2}{(1 + 0.104)^2} \frac{1 - 0.1}{1 + 0.1} \\ &= 2.31 \times 10^{-6} F = 2.31 \ \mu F \end{aligned}$$

From equation (4) and $V_o/V_m = 0.1$, $V_o$ and $V_m$ are 662 V and 66.2 V, respectively. The inductances of source inductor 12 and load inductor 28, $L_1$ and $L_2$, can be found for a given set of $\Delta I_1$ and $\Delta I_2$ current ripples (where $I_2$ and $I_2$ are the currents flowing through inductors 12 and 28, respectively) by the following approximate formulas.

$$L_1 = \frac{(V_o - V_1)^2 T}{2\Delta I_1 (V_o + V_m)} \left( \frac{1}{1 + G} \right) \qquad (8)$$

$$L_2 = \frac{(V_o - V_2)^2 T}{2\Delta I_2 (V_o + V_m)} \left( \frac{1}{1 + G} \right) \qquad (9)$$

For 20% and 40% input and output current ripple, respectively, $L_1 = 0.1$mH and $L_2 = 1.6 \ \mu$H. Similarly, the output filter capacitor 30, $C_2$, can be found from $$C_2 = \frac{\Delta I \cdot T}{8 \Delta V_2} \qquad (10)$$

where $\Delta V_2$ is the given peak-to-peak output voltage ripple. For 4% output voltage ripple, $C_2$ is 800 $\mu$F.

Where snubber inductors 14 and 22 are included, the stored energy in link capacitor 20 must be sufficient to discharge the appropriate snubber inductor to the point that the outgoing switch can be gated off at zero current. To assure this discharge the following condition must be satisfied:

$$\frac{1}{2} C_1 V_c(0^2) > \frac{L_s}{2} (I_1 + I_2)^2,$$

where $V_c(0)$ is the voltage across link capacitor 20 at the time of switching, $L_2$ is the snubber inductor inductance, and $I_1$ and $I_2$ are the input and output currents, respectively. Thus, to operate in the soft-switching region, the following condition must be met:

$$\frac{(2 - K)^2}{K} > \frac{4 L_s}{R_{max} T d^2},$$

where K is the ratio between the peak-to-peak and average voltage across link capacitor 20, $R_{max}$ is the load resistance at minimum output power, T is the switching period, and d is the duty cycle of the switch $S_2$. As an example, the snubber inductors may have values of 0.3 mH.

Figure 5:
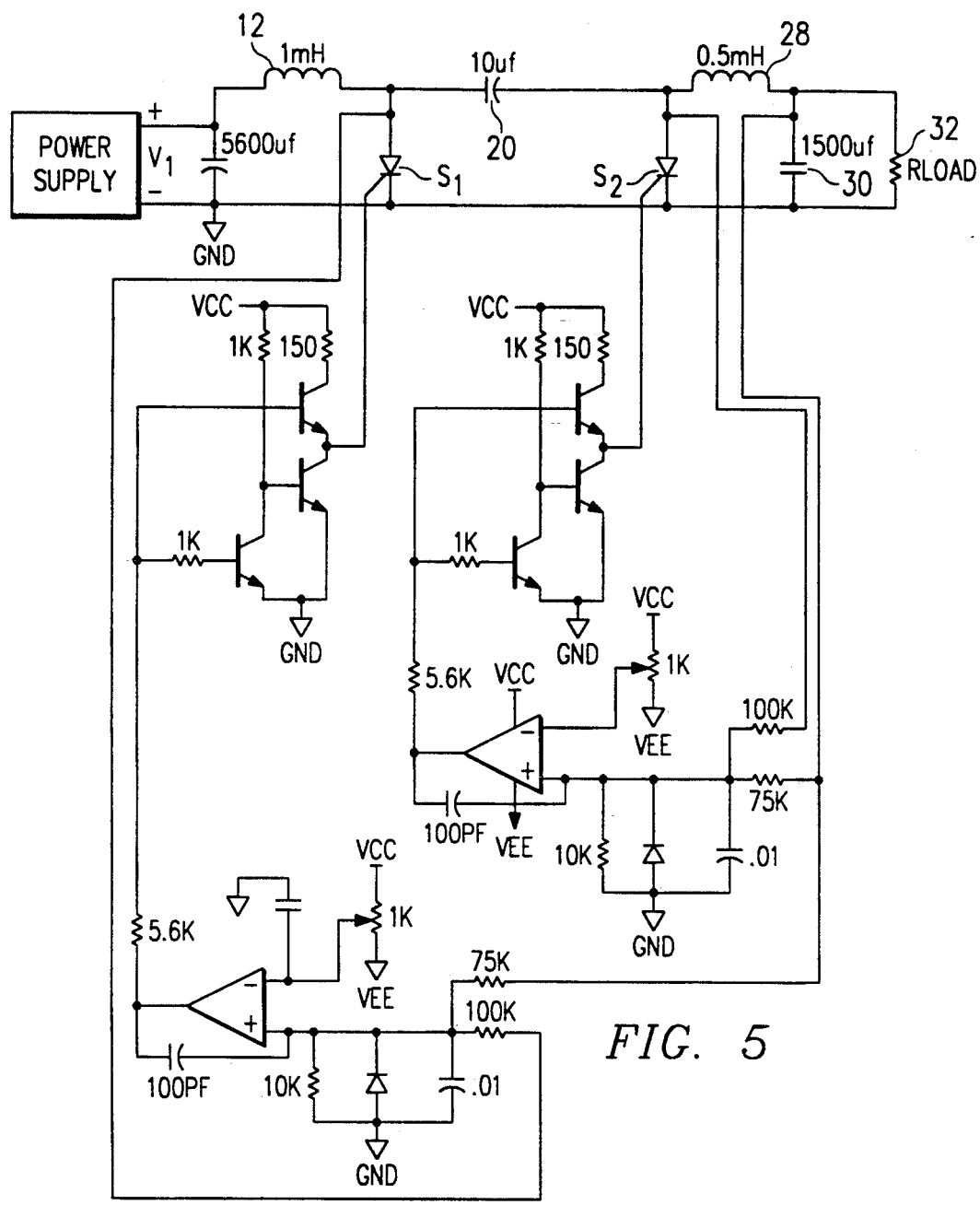
FIG. 5 is a circuit schematic of a switching control circuit for use with a capacitively coupled converter constructed according to the teachings of the present invention.
Figure 6:
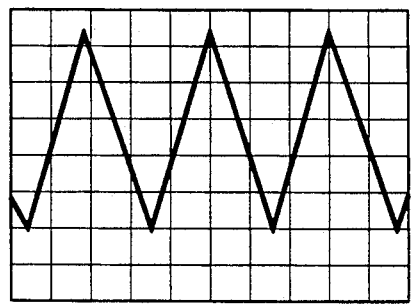
FIG. 6 is an oscilloscope tracing of the coupling capacitor voltage of an experimental capacitively coupled converter.
Figure 7:
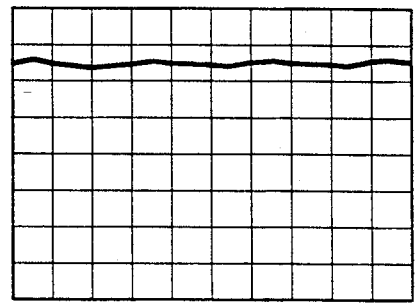
FIG. 7 is a oscilloscope tracing of the output voltage of an experimental capacitively coupled converter.

FIG. 5 is a circuit schematic of a known switching control circuit used to switch an experimental capacitively coupled converter built as a proof of principle circuit. The circuit elements and values of the switching control circuit and the C³ circuit are coupled as shown in FIG. 5. The capacitively coupled converter switched by the circuit of FIG. 5 used SCRs as switches S₁ and S₂. Furthermore, snubber inductors 14 and 22 were omitted. FIGS. 6 and 7 show oscilloscope tracings of the voltage across link capacitor 20 and the output voltage, respectively. FIG. 6 is scaled at 50 volts per division and illustrates the AC waveform across link capacitor 20. FIG. 7 is scaled at 2.5 volts per division, and shows the output voltage.

Since the link capacitor 20 is the main energy transfer element, it withstands relatively large current and voltage stresses. However, the design of the present invention allows for capacitance values that are much smaller than presently existing capacitors that operate at the same frequency ranges. Therefore, good power density requirements can be met for capacitor 20 even at high power levels using such capacitors as polypropyline or multilayer ceramic capacitor technologies.

Figure 8A:
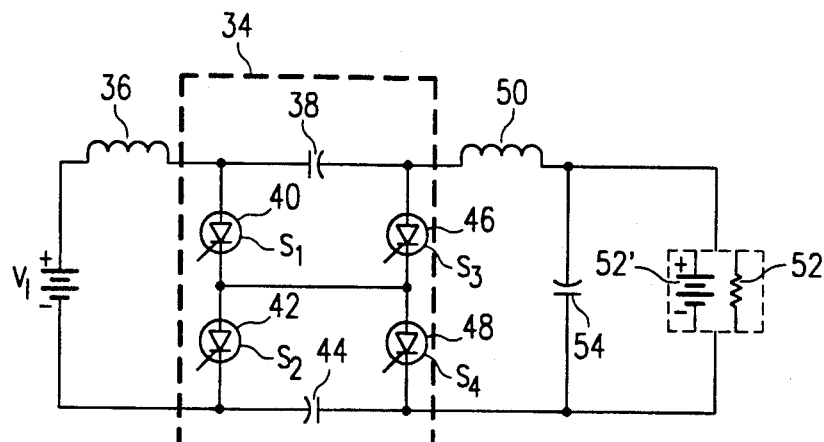
FIG. 8a is a circuit schematic of a dual capacitively coupled converter circuit constructed according to the teachings of the present invention.

FIG. 8a is a circuit schematic of a dual-capacitive coupled converter circuit 34. As shown in FIG. 8a, an input voltage is coupled to circuit 34 through load inductor 36. Load inductor 36 is coupled to link capacitor 38 and switch 40. Switch 40 is also coupled to switch 42. Switch 42 is coupled to link capacitor 44. On the load side of circuit 34, switches 46 and 48 are coupled between capacitors 38 and 44. Furthermore, link capacitor 38 is coupled through load inductor 50 to a load 52 and an output filter capacitor 54.

Figure 8B:
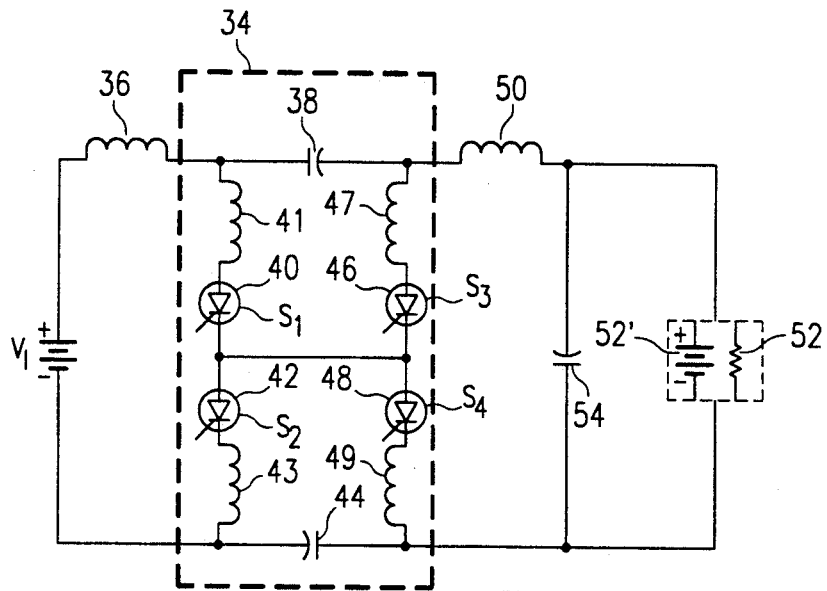
FIG. 8b is a circuit schematic of a dual capacitively coupled converter circuit with snubber inductors constructed according to the teachings of the present invention.

The dual capacitively coupled converter 34 helps reduce the input and output current ripple associated with circuit 10 and provides more degrees of freedom of control. As shown in FIG. 8a, switches 40, 42, 46, and 48 may comprise SCRs. Snubber inductors (41, 43, 47, and 49), the function of which is similar to that for inductors 14 and 22 connection with circuit 10, may also be connected in series with each of the switches 40, 42, 46, and 48, as shown in FIG. 8b. Furthermore, gate turn-off devices such as those described in connection with circuit 10 may also be used, rather than the SCRs shown in FIG. 8a. The operation of circuit 34 is similar to that described above in connection with circuit 10, with the difference being that four switches are to be operated rather than two. The switching sequence for the circuit 34 shown in FIG. 8a is S₁, S₄, S₂, S₃, S₁, S₄, S₂, S₃, etc, It should be understood that the circuits 10 and 34 may also be configured for magnetic isolation. This is accomplished by coupling link capacitor 20 to a transformer, rather than directly to the load side of these circuits. On the load side, the load switch (or switches) and load inductor would be coupled to the transformer through another link capacitor. The circuit analysis for this magnetically isolated circuit is substantially the same as that described above in connection with circuits 10 and 34.

Figure 9:
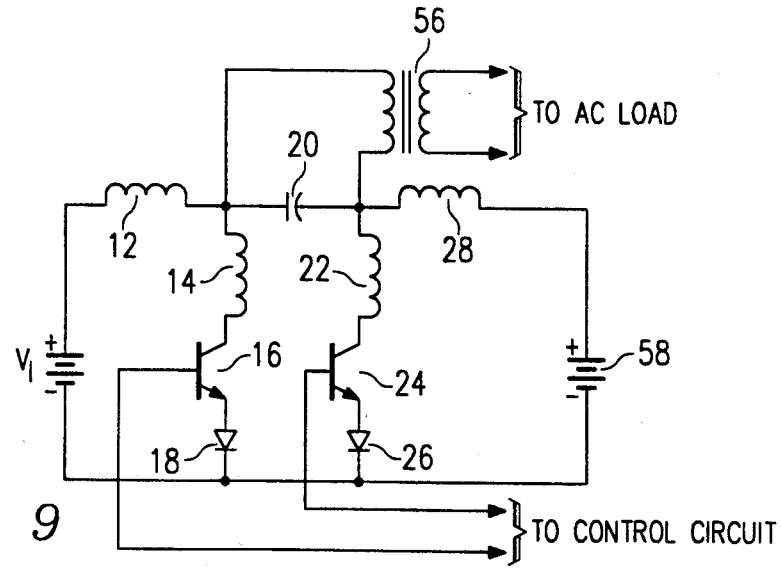
FIG. 9 is a circuit schematic of a DC to AC converter constructed according to the teachings of the present invention.

As described above, circuit 10 and circuit 34 comprise DC to DC converters. In FIG. 9, a configuration of circuit 10 is shown in which the present invention comprises a DC to AC converter. As shown in FIG. 9, a transformer 56 is coupled across link capacitor 20. The transformer 56 is then coupled to an AC load. In this particular application, the load described in connection with circuit 10 would comprise another source, such as a battery 58 shown in FIG. 9. With this configuration, the AC waveform resulting across link capacitor 20 and described in connection with FIGS. 3, 4, and 6, provides an AC source that can be then stepped up or down through transformer 56.

It is important that the design and operation of the present invention results in the voltage across link capacitor 20 reversing at particular times during each switching cycle. This voltage reversal allows for the zero current soft switching of the present invention, resulting in the significantly reduced power losses in the switching components. The significantly reduced switching losses allow the use of SCR switches for high power applications, such as those requiring power in the range of hundreds of kilowatts or even megawatts. Furthermore, these significant reductions in power losses allow for the use of gate turn-off devices for applications requiring high speeds, such as those up into the hundreds of kilohertz.

Although the present invention has been described in detail, it should be understood that various changes, substitutions, and alterations can be made without departing from the spirit and scope of the invention as defined solely by the appended claims.

What is claimed is:

1. A zero-current soft switching power converter, comprising:
   a link capacitor having a first and a second electrode, said link capacitor operable to store and discharge electric charge;
   a source switch coupled to said first electrode and operable to switch when substantially zero current passes through said source switch; and
   a load switch coupled to said second electrode and operable to switch when substantially zero current passes through said load switch,
   said source and load switches switched in a switching cycle such that voltage generated across said link capacitor reverses polarity each switching cycle to effect the substantially zero current switching conditions of said source switch and said load switch.

2. The power converter of claim 1, wherein the power converter operates to convert DC power to DC power.

3. The power converter of claim 1, wherein the power converter operates to convert DC power to AC power.

4. The converter of claim 1, and further comprising:
   a source snubber inductor coupled between said first electrode and said source switch, said source snubber inductor operable to recirculate source snubber inductor energy when current through said source switch decreases due to current conduction through said load switch; and
   a load snubber inductor coupled between said second electrode and said load switch, said load snubber inductor operable to recirculate load snubber inductor energy when current through said load switch decreases due to current conduction through said source switch.

5. The converter of claim 1, wherein:
   said source switch comprises a first bipolar junction transistor in series with a first blocking diode; and
   said load switch comprises a second bipolar junction transistor in series with a second blocking diode.

6. The converter of claim 1, wherein:
   said source switch comprises a first silicon controlled rectifier; and said load switch comprises a second silicon controlled rectifier.

7. The converter of claim 1, wherein:
said source switch comprises a first MOS-controlled thyrister; and
said load switch comprises a second MOS-controlled thyrister.

8. The converter of claim 1, wherein:
said source switch comprises a first gate turn-off device in series with a first blocking diode; and
said load switch comprises a second gate turn-off device in series with a second blocking diode.

9. The converter of claim 1, and further comprising:
a source inductor coupled between said first electrode and a voltage source; and
a load inductor coupled between said second electrode and a load.

10. The converter of claim 9, wherein said load comprises a voltage source.

11. The converter of claim 9, and further comprising a load filter capacitor coupled in parallel with said load.

12. A zero-current soft switching DC to DC power converter, comprising:
a link capacitor having a first and a second electrode, said link capacitor operable to store and discharge electric charge, said link capacitor characterized by voltages across said link capacitor;
a source switch operable to switch when substantially zero current passes through said source switch;
a load switch operable to switch when substantially zero current passes through said load switch;
a source snubber inductor coupled between said first electrode and said source switch, said source snubber inductor operable to recirculate source snubber inductor energy when current through said source switch decreases due to current conduction through said load switch; and
a load snubber inductor coupled between said second electrode and said load switch, said load snubber inductor operable to recirculate load snubber inductor energy when current through said load switch decreases due to current conduction through said source switch,
said source and load switches switched in a switching cycle such that said voltage across said link capacitor reverses polarity each switching cycle.

13. A zero-current soft switching DC to AC power converter, comprising:
a link capacitor having a first and a second electrode, said link capacitor operable to store and discharge electric charge;
a source switch coupled to said first electrode and operable to switch when substantially zero current passes through said source switch;
a load switch coupled to said second electrode and operable to switch when substantially zero current passes through said load switch;
said source and load switches switched in a switching cycle such that voltage generated across said link capacitor reverses polarity each switching cycle to effect the substantially zero current switching conditions of said source switch and said load switch; and
a transformer coupled across said link capacitor, such that an AC wave form is output from said transformer.

14. The converter of claim 13, and further comprising:
a first source inductor coupled between said first electrode and first voltage source; and
a second source inductor coupled between said second electrode and second voltage source.

15. The converter of claim 13, and further comprising:
a source snubber inductor coupled between said first electrode and said source switch, said source snubber inductor operable to recirculate source snubber inductor energy when current through said source switch decreases due to current conduction through said load switch; and
a load snubber inductor coupled between said second electrode and said load switch, said load snubber inductor operable to recirculate load snubber inductor energy when current through said load switch decreases due to current conduction through said source switch.

16. A dual zero-current soft switching power converter, comprising:
a first link capacitor having a first and a second electrode, said first link capacitor operable to store and discharge electric charge, said first link capacitor characterized by voltages across said first link capacitor;
a second link capacitor having a third and a fourth electrode, said second link capacitor operable to store and discharge electric charge, said second link capacitor characterized by voltages across said second link capacitor;
a first source switch coupled to said first electrode and operable to switch when substantially zero current passes through said first source switch;
a second source switch coupled to said first source switch sand said third electrode and operable to switch when substantially zero current passes through said second source switch;
a first load switch coupled to said second electrode and operable to switch when substantially zero current passes through said first load switch; and
a second load switch coupled to said first load switch, said first source switch and said fourth electrode and operable to switch when substantially zero current passes through said second load switch,
said source and load switches switched in a switching cycle such that said voltages across said link capacitors reverse polarity each switching cycle to effect the substantially zero current switching conditions of said source switches and said load switches.

17. The converter of claim 16, and further comprising:
a first source snubber inductor coupled between said first electrode and said first source switch;
a second source snubber inductor coupled between said third electrode and said second source switch;
a first load snubber inductor coupled between said second electrode and said first load switch; and
a second load snubber inductor coupled between said fourth electrode and said second load switch.

18. The converter of claim 16, and further comprising:
a source inductor coupled between said first electrode and a voltage source; and
a load inductor coupled between said second electrode and a load.

19. The converter of claim 18, and further comprising a load filter capacitor coupled in parallel with said load.

20. The converter of claim 18, wherein said load comprises a voltage source.

21. A method of power conversion, comprising the steps of:
   providing a current source to a source side of a converter;
   periodically switching the source side current through a source switch when substantially zero current passes through the source switch;
   capacitively coupling the current to a load side of the converter through a link capacitor;
   periodically switching the load side current through a load switch when substantially zero current passes through the load switch; and
   synchronizing and timing the source side and load side switching in a switching cycle such that the voltage across the link capacitor reverses polarity each switching cycle to effect the substantially zero current switching conditions of said source switch and load switch.

22. The method of claim 21, and further comprising the steps of:
   providing a second current source to the load side; and
   generating an AC voltage at a transformer coupled across the link capacitor.

23. The method of claim 21, and further comprising the steps of:
   recirculating source snubber inductor energy with a source snubber inductor when current through the source switch decreases due to current conduction through the load switch; and
   recirculating load snubber inductor energy with a load snubber inductor when current through the load switch decreases due to current conduction through the source switch.

* * * * *